(12) United States Patent
Porskrog et al.

(10) Patent No.: US 8,079,439 B2
(45) Date of Patent: Dec. 20, 2011

(54) HYDRAULIC STEERING

(75) Inventors: Bendt Porskrog, Nordborg (DK); Kjeld Buus Jensen, Soenderborg (DK); Finn Visgaard Nielsen, Soenderborg (DK); Svend Erik Thomsen, Nordborg (DK)

(73) Assignee: Sauer-Danfoss Aps, Nordborg (DK)

( * ) Notice: Subject to any disclaimer, the term of this patent is extended or adjusted under 35 U.S.C. 154(b) by 0 days.

(21) Appl. No.: 12/610,533

(22) Filed: Nov. 2, 2009

(65) Prior Publication Data
US 2010/0044142 A1 Feb. 25, 2010

Related U.S. Application Data

(62) Division of application No. 11/061,559, filed on Feb. 18, 2005, now Pat. No. 7,610,988.

(30) Foreign Application Priority Data

Feb. 27, 2004 (DE) .......................... 10 2004 009 672
May 3, 2004 (DE) .......................... 10 2004 021 531

(51) Int. Cl.
 *B62D 5/08* (2006.01)
 *B62D 5/06* (2006.01)
 *B62D 5/00* (2006.01)
 *B62D 6/00* (2006.01)
(52) U.S. Cl. ........ 180/441; 180/417; 180/421; 180/442; 701/42
(58) Field of Classification Search .................. 180/417, 180/421, 441, 442; 701/42
See application file for complete search history.

(56) References Cited

U.S. PATENT DOCUMENTS

| | | | | |
|---|---|---|---|---|
| 5,835,870 A | * | 11/1998 | Kagawa | 701/23 |
| 6,050,359 A | * | 4/2000 | Mouri et al. | 180/415 |
| 6,198,992 B1 | * | 3/2001 | Winslow | 701/23 |
| 6,502,661 B1 | * | 1/2003 | Heitzer | 180/403 |
| 7,789,190 B2 | * | 9/2010 | Thomsen et al. | 180/441 |
| 2007/0221435 A1 | * | 9/2007 | Vernersen et al. | 180/441 |
| 2007/0221437 A1 | * | 9/2007 | Kryhlmand et al. | 180/441 |

FOREIGN PATENT DOCUMENTS

DE 3607710 A * 9/1986

* cited by examiner

*Primary Examiner* — Joannie Silbermann
*Assistant Examiner* — Daniel Yeagley
(74) *Attorney, Agent, or Firm* — McCormick, Paulding & Huber LLP

(57) ABSTRACT

The invention concerns a hydraulic steering with a steering initiator, a steering unit with feedback properties, which can be activated by the steering initiator, the steering unit having a supply connection arrangement with a pressure connection (P) and a tank connection (T) and a working connection arrangement with two working connections (L, R), an auxiliary-force operated steering valve, which is located in parallel with the steering unit between the supply connection arrangement (P, T) and the working connection arrangement (L, R), and a feedback suppressing device, which is active, when the steering valve is active. It is endeavored to find a simple manner of ensuring the priority of the steering initiator over the steering valve. For this purpose, the steering initiator interacts with an activation sensor, which deactivates the feedback suppressing device on an activation of the steering initiator.

8 Claims, 3 Drawing Sheets

HYDRAULIC STEERING

CROSS-REFERENCE TO RELATED APPLICATIONS

This application is a Divisional Application of Non-Provisional application Ser. No. 11/061,559 entitled 'Hydraulic Steering' to Bendt Porskrog, et al. filed Feb. 18, 2005 and claiming priority to German Patent Application No. 10 2004 009 672.4, filed on Feb. 27, 2004, and German Patent Application No. 10 2004 021 531.6 filed on May 3, 2004, the contents of which are incorporated by reference herein.

FIELD OF THE INVENTION

The invention concerns a hydraulic steering with a steering initiator.

BACKGROUND OF THE INVENTION

One type of a steering is known from EP 0 244 418 B1. Such steerings are particularly used in driven machines, for example mobile agricultural equipment. The steering unit activated by the steering initiator, for example a steering handwheel, is used to permit a driver to steer the vehicle. This mode of operation is particularly useful in the road traffic. The auxiliary-force activated steering valve can be used for automatic steering of the vehicle, for example along a path defined from the outside.

In a steering unit, which has feedback properties, it is not absolutely necessary to have a mechanical connection between the steered wheels and the steering initiator, for example the steering handwheel. However, a hydraulic connection is continuously available from the steering motor to the steering unit, so that forces, which act upon the wheels steered by means of the steering motor, can also be felt on the steering handwheel. As soon as the steered wheels are loaded from the outside, pressures are generated in the steering motor, which propagate up to the steering unit thus reaching the measuring motor, which again transfer them to the steering handwheel.

In a steering having a steering unit with feedback properties, it can therefore frequently be seen that the steering initiator moves, when the vehicle is steered by means of the auxiliary-force activated steering valve. When the steering initiator exists in the form of a steering handwheel, this steering handwheel can turn at an activation of the steering by the steering valve, which can be very disturbing for the driver.

Therefore, a change-over valve has been provided in the known steering, which in a first position connects the working connection arrangement with the steering motor and in a second position connects the working connections with each other and separates them from the steering motor. In this case, the steering of the vehicle takes place merely via the steering valve.

This, in fact, prevents a feedback from the steering motor to the steering handwheel, when the vehicle is steered via the steering valve. However, it is not possible for the driver of the vehicle to intervene in the steering behaviour of the vehicle via the steering handwheel, when this is necessary or desired. This can lead to dangerous situations.

SUMMARY OF THE INVENTION

The invention is based on the task of providing a simple manner of ensuring the priority of the steering initiator over the steering valve.

With a steering as mentioned in the introduction, this task is solved in that the steering initiator interacts with an activation sensor, which deactivates the feedback suppressing device on an activation of the steering initiator.

This relatively simple embodiment ensures that in any operating situation the steering handwheel has priority over the effect originating from the steering valve. The activation sensor continuously determines if the steering initiator is activated. As soon as the steering initiator is activated, it is assumed that the driver wishes to enable a direction change by means of the steering initiator. In this case, the steering initiator immediately deactivates the feedback suppressing device, so that it is immediately possible for the steering unit to act upon the steering motor. As the pressures acting upon the steering motor via the steering unit are always larger than the pressures supplied by the steering valve, it is ensured that an activation of the steering initiator will give the steering unit priority over the steering valve.

It is preferred that the steering initiator exists in the form of a steering handwheel, which is connected with the steering unit via a steering shaft, the activation sensor determining an activation of the steering handwheel. When a steering handwheel is activated, this is a unique signal that a direction change of the vehicle is desired. An activation of the steering handwheel is relatively easily determined.

It is preferred that the activation sensor interacts with the steering shaft. This means that the activation sensor is located in a position, in which it does not disturb the driver. The access to the steering handwheel is not impeded in any way. A rotation by a small angle in the range from 1 to 5° can already be determined on the steering shaft, which indicates that a steering activation via the steering handwheel is desired.

Preferably, the activation sensor is a torque sensor. A torque sensor determines when a force is acting in the rotation direction. This force does not yet have to be followed by a movement.

Alternatively, the activation sensor can also be a rotation angle sensor. Already small rotation angles are sufficient to indicate that the steering handwheel has been activated. It is relatively easy to determine a rotary movement of the steering handwheel.

Preferably, the feedback suppressing device has a brake, which acts upon the steering initiator. Thus, the steering initiator is simply retained, when the vehicle is steered via the steering valve. A movement of the steering initiator is thus reliably prevented.

Preferably, the brake acts upon the steering handwheel via the steering shaft. Thus, the steering shaft merely has to be prevented from turning to avoid that the feedback from the steering motor on the steering handwheel can be felt by the driver. This does not require changes of the feedback properties of the steering unit.

Preferably, the activation sensor is located between the brake and the steering handwheel. In spite of an activated brake, the activation sensor can determine when someone turns the steering handwheel. Such a rotary movement of the steering handwheel can at least propagate to the brake, and then leads to a distortion of the steering shaft. Such a distortion does not have to be large to be determined.

It is preferred that the brake is an electrically activated brake. An electrically activated brake is easily activated or deactivated. It can, for example, work electro-magnetically.

It is preferred that the brake generates a maximum braking torque of 8 Nm. Such a braking torque can easily be overcome by a driver, that is, in spite of an activated brake the steering handwheel can be turned without much effort. The effect of the brake is sufficient to prevent the steering initiator from moving along at an activation of the steering valve and the resulting activation of the steering motor.

In an alternative or additional embodiment, it can be ensured that the feedback suppressing device has a change-over valve acting upon the working connection arrangement. This change-over valve changes its switching position to block or permit the feedback from the steering motor to the steering initiator.

In a preferred embodiment it is ensured that in its activated position the change-over valve blocks at least one working connection. When a working connection is blocked, the circuit between the steering motor and the steering arrangement is interrupted, so that influences of the steering motor can no longer penetrate to the steering initiator via the steering valve or via external forces.

Additionally or alternatively, the change-over valve can, in its activated position connect the steering valve with a steering motor, and in its deactivated position connect the steering unit with the steering motor. In the activated position, the working connection arrangement is then interrupted. In the deactivated position of the change-over valve the connection arrangement of the steering valve is interrupted.

BRIEF DESCRIPTION OF THE DRAWINGS

In the following, the invention is described on the basis of preferred embodiments in connection with the drawing, showing.

DETAILED DESCRIPTION OF THE PREFERRED EMBODIMENTS

Figure 1:
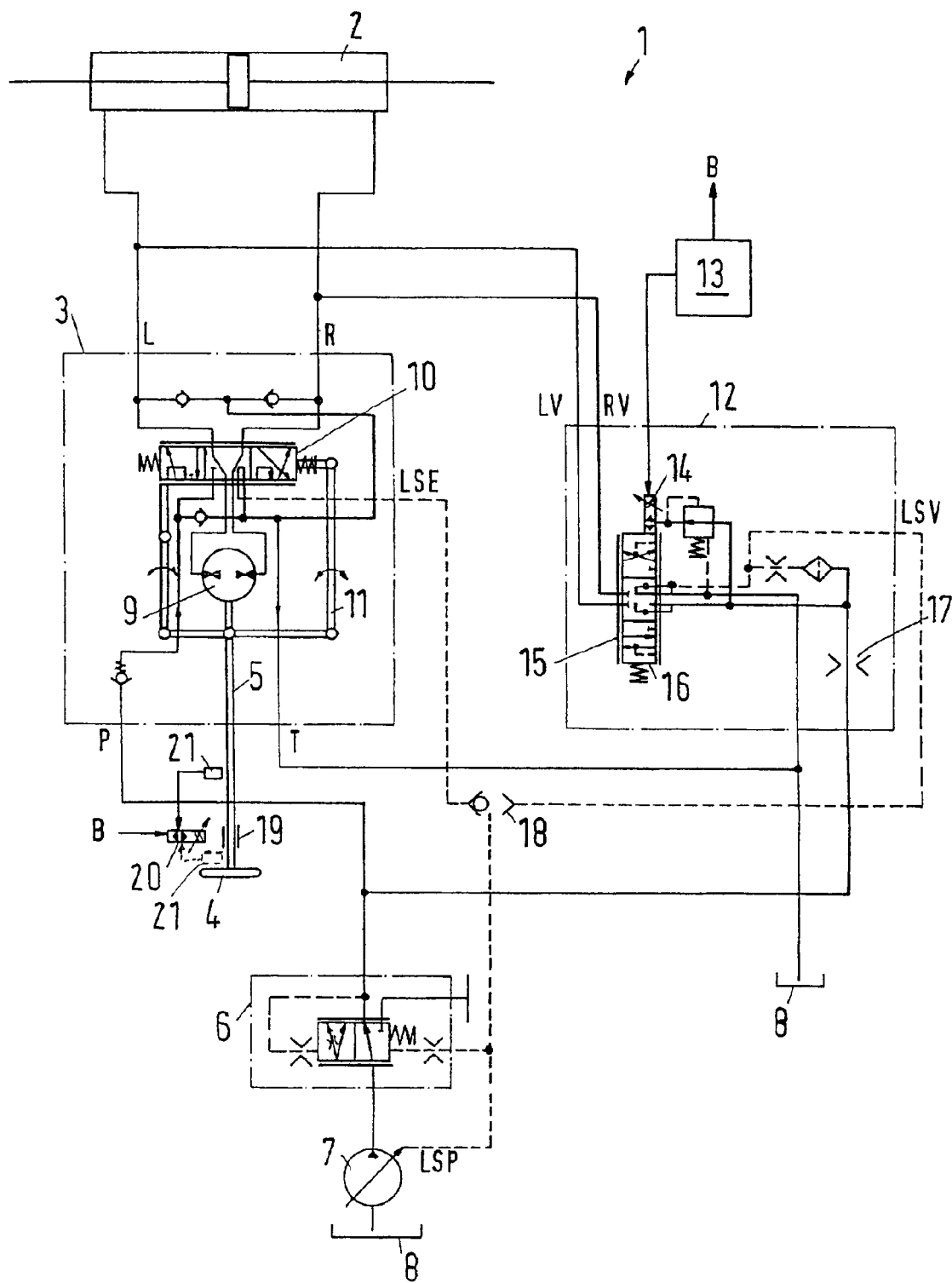
FIG. 1 is schematic diagram of a hydraulic steering with a first embodiment of a feedback suppressing device.

A hydraulic steering according to FIG. 1 has a steering motor 2, which is provided for steering wheels, not shown in detail. In vehicles with articulated steering, the steering motor can also be provided to swing the front part and the rear part of a vehicle in relation to each other.

The steering motor 2 can be activated in two different ways. Firstly, a steering unit 3 is provided, which is activated by a steering handwheel 4 via a steering shaft 5. The steering unit 3 has a supply connection arrangement with a pressure connection P and a tank connection T, as well as a working connection arrangement with two working connections L, R. The working connections L, R are connected with the steering motor 2. The pressure connection P is connected with a pump 7 via a priority valve 6. The tank connection T is connected with a tank 8.

The steering unit has a measuring motor 9 and a directional valve 10. The steering unit 3 has feedback properties, that is, a so-called "reaction" steering unit, in which a pressure change at the working connection L, R can be felt at the steering handwheel 4. In the hydraulic diagram, this is shown by means of a connecting rod 11, which does not exist in reality or not in this way. Further, in the neutral position of the directional valve 10, a hydraulic connection exists between the working connection arrangement L, R and the measuring motor 9. This means that, when the wheels steered by the steering motor 2 are influenced by jerks or other external forces, such jerks can be felt by the driver on the steering handwheel 4. Such feedback can, however, be advantageous for the driving comfort.

Further, the steering motor is connected with a working connection arrangement LV, RV of a steering valve 12, and can thus be activated by the steering valve 12. The steering valve 12 can be activated via a control device 13. The control device 13 can have different embodiments, for example, it can be a radio receiver, via which the vehicle can be remote-controlled, it can be a scanner, by means of which the vehicle can be led along a predetermined path, or it can be a device located somewhere else in the vehicle, by means of which the vehicle can be steered from a second position.

The control device 13 is connected with a drive 14 of a proportional valve 15. The proportional valve 15 has a slide 16, which can be displaced more or less in one direction or the other by a control signal generated by the control device 13, releasing more or less a flow path from the pump connection P to the steering motor 2 and from the steering motor 2 to the tank connection T in dependence of the direction and the size of the deflection.

However, between the pump connection P and the proportional valve 15 a bleed or a throttle 17 is further provided, which ensures that the pressure at the outlet of the proportional valve 15 is always smaller than the pressure at the outlet of the directional valve 10, also when both the directional valve 10 and the proportional valve 15 are activated simultaneously. This throttle 17 can be avoided, when at simultaneous activation of the steering unit 3 and the steering valve 12 it is ensured that the steering unit 3 has priority over the steering valve 12.

In a manner known per se, the steering unit 3 is provided with a load-sensing outlet LSE and the steering valve 12 is provided with a load-sensing outlet LSV. Both load-sensing outlets are connected with the pump 7 via a change-over valve 18 with a load-sensing inlet LSP. Here, the pump 7 is shown as a displacement pump. However, the displacement pump can also be replaced by a pump arrangement, in which it is otherwise ensured that the pressure supplied by the pump corresponds to the demand.

Usually, the steering motor is steered either via the steering unit 3 or via the steering valve 12. When, now, the steering motor 2 is activated via the steering valve 12, a pressure difference occurs between the working connections L, R, which can, due to the feedback properties of the steering unit 3, cause that the steering handwheel 4 turns. This can be disturbing or unpleasant for the driver.

To prevent such a turning of the steering handwheel 4, a brake 19 is provided, which acts upon the steering shaft 5. The brake 19 is activated via a brake drive 20. The brake drive 20 can, for example, be a magnet, which draws brake pads towards the steering shaft 5. The braking torque exerted by the brake does not have to be particularly large. It can, for example, be in the range between 5 and 8 Nm. Such a braking torque is sufficient to prevent a movement of the steering handwheel in spite of the feedback properties of the steering unit 3.

The brake 19 is activated by the control device 13, when the control device 13 activates the proportional valve 15. For this purpose, a line B is provided.

In order to be able to ensure, also during steering of the vehicle via the steering valve 12, that the driver can steer by means of the steering handwheel 4, which may be required in connection with an emergency, an activation sensor 21 is provided, which interacts with the steering shaft 5. The activation sensor 21 determines if the steering handwheel 4 has been turned. Due to the relatively small braking torque provided by the brake 19, such a turning is possible without problems, however, requires a slightly large force to be provided by the driver. Also with engaged brake 19, a small turning of the steering shaft is usually possible. In this case, the activation sensor 21 can exist in the form of a rotation angle sensor, which determines the rotation movement of the steering shaft 5 being turned against the force of the brake 19.

An alternative position of the activation sensor 21 is shown by means of dotted lines. The activation sensor 21 is namely located between the steering handwheel 4 and the brake 19. Also in this case, the activation sensor 21 can, of course, be a rotation angle sensor. However, it can also be a torque sensor. When namely, the steering handwheel 4 is turned, when the brake 19 is engaged, this will cause a small distortion of the steering shaft 5, which can be determined by the torque sensor. Of course, also other determination methods for a torque can be imagined.

In the embodiment shown, the activation sensor 21 acts immediately upon the braking drive 20, thus overriding the order of the control device 13. When the activation sensor 21 establishes that the steering handwheel 4 is turned, and that thus also the steering shaft 5 must turn, the brake 19 is immediately disengaged.

However, it is also possible to let the activation sensor 21 interact with the control device 13, so that the disengagement of the brake 19 is caused by the control device 13.

As soon as the driver turns the steering handwheel 4, the steering unit 3 is activated. As the steering unit 3 provides a larger outlet pressure at the working connection arrangement L, R than the steering valve 12, the vehicle is steered by means of the steering handwheel 4 as long as the driver finds this necessary.

The directional valve 10 usually has a slide set with an inner slide and an outer slide, as known per se. When the steering motor 2 is activated via the steering valve 12, a pressure difference occurs between the measuring motor and the slide set. As, however, the inner slide is retained, the slide set will only open slightly to balance this pressure difference. This gives a balanced situation with no significant oil flow through the steering unit 3.

Thus, the brake 19 forms a feedback suppressing device, which can be activated at start-up of the steering valve 12 and deactivated via the activation sensor 21.

Figure 2:
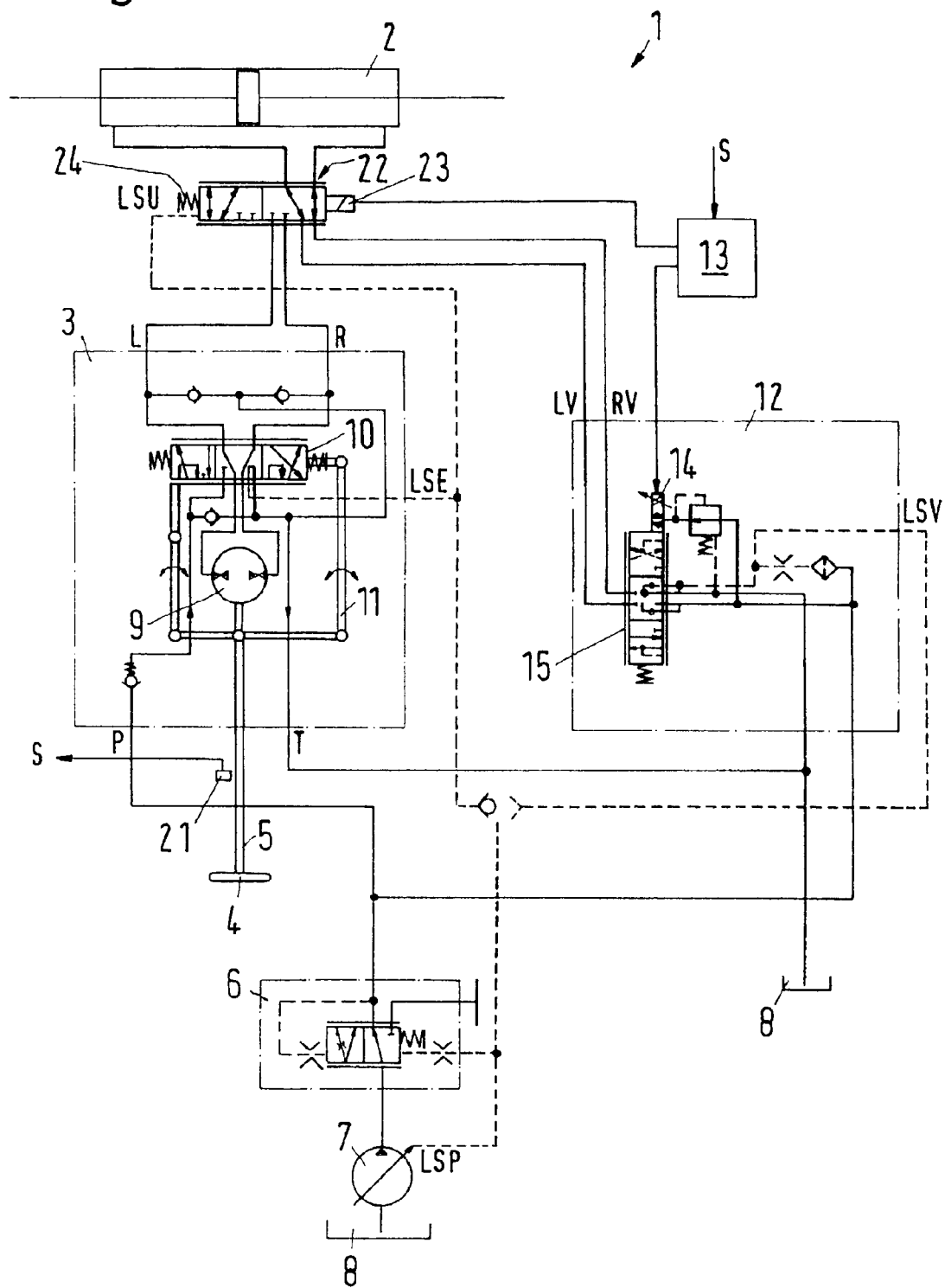
FIG. 2 is a modified form of a hydraulic steering with a different feedback suppressing device.

FIG. 2 shows a modified embodiment in which the same or functionally the same elements have the same reference numbers.

Instead of the brake 19 (or additionally to it), a change-over valve 22 is connected between the working connection arrangement L, R and the steering motor 2. In the switching position shown, the change-over valve 22 connects the working connection arrangement LV, RV of the steering valve 12 with the steering motor 2. When changed over, it connects the working connection arrangement L, R of the steering unit 3 with the steering motor 2.

Thus, the change-over valve 22 ensures that always only either the steering unit 3 or the steering valve 12 can act upon the steering motor 2. A parallel operation of the two units 3, 12 is not possible.

The change-over valve 22 is changed to the position shown by the control device 13, as soon as the steering motor 2 has to be activated by the steering valve 12.

If, however, the activation sensor 21 determines that the steering handwheel 4 and thus the steering shaft 5 are turned, this is reported via a line S to the control device 13, which then activates a drive 23, for example a magnet drive, of the change-over valve 22 and changes the change-over valve 22 to the other switching position, in which the working connection arrangement L, R of the steering unit 3 is connected with the steering motor 2. This change can take place relatively fast, as it is supported by a spring 24. Further, the pressure at the load sensing outlet LSE of the steering unit 3, which builds up relatively fast, also acts upon the change-over valve 22 via an inlet LSU.

As soon as the steering handwheel 4 is turned, the activation of the steering motor 2 takes place exclusively via the steering unit 3.

Figure 3:
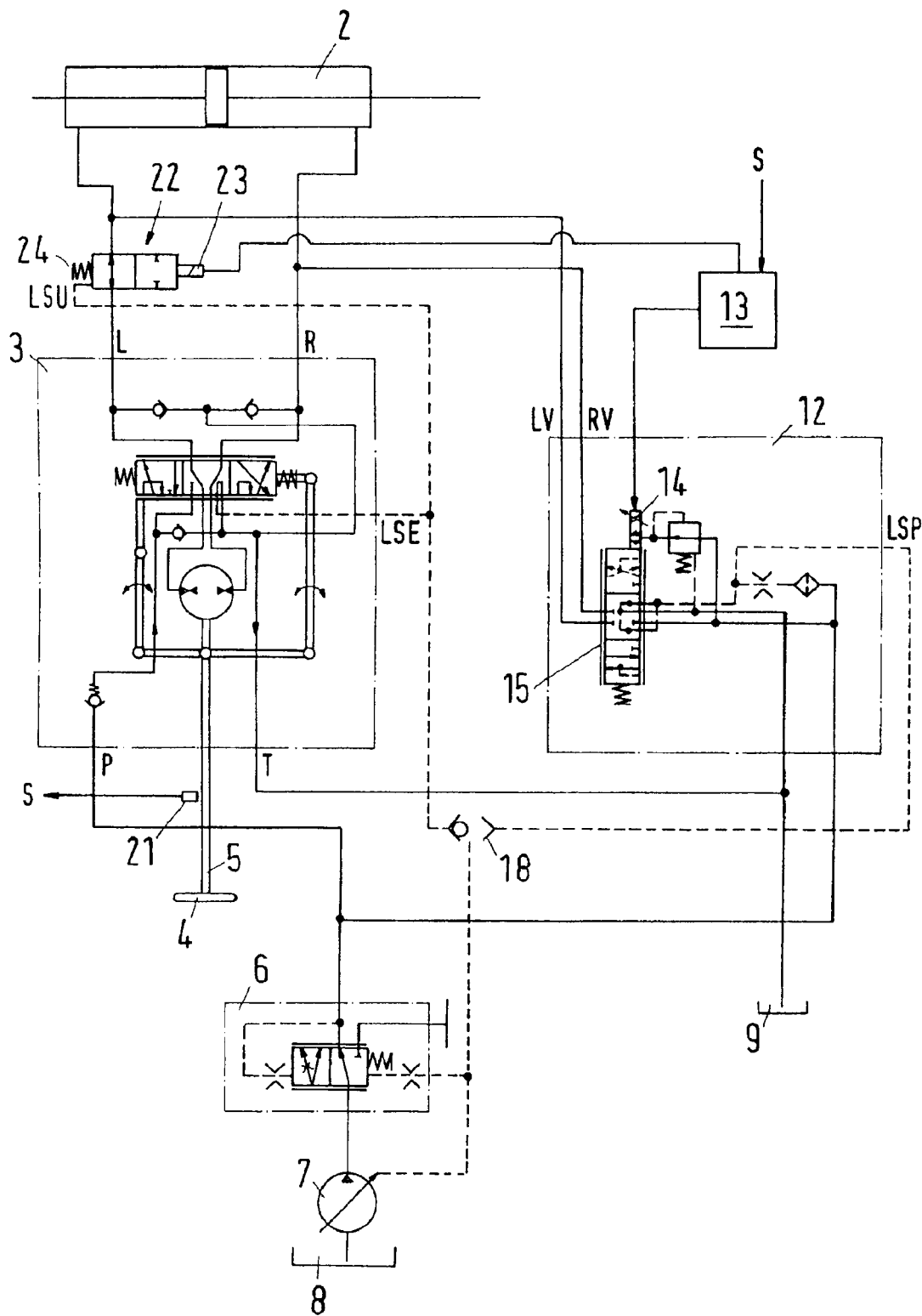
FIG. 3 is a third embodiment of a hydraulic steering.

In relation to FIG. 2, FIG. 3 shows a simplified embodiment, in which the change-over valve 22 merely either releases (switching position shown) or interrupts a working line between a working connection L and the steering motor 2. When the change-over valve 22 assumes the switching position shown, a feedback from the steering motor 2 on the steering handwheel 4 is possible, but on the other hand also a control of the steering motor 2 by the steering handwheel 4. When the change-over valve 22 is switched to the other position, the fluid circuit through the steering unit 3 is interrupted and thus also the feedback.

Thus, in the embodiments according to FIGS. 2 and 3, the change-over valve 22 forms the feedback suppressing device.

In all three embodiments, a small turning of the steering shaft 5, for example in the range from 1 to 5°, is sufficient to signal the wish for controlling the vehicle via the steering unit 3. Such a small turning of the steering shaft 5 is reliably determined by the activation sensor 21, which then immediately deactivates the feedback suppressing device 19, 22.

In the embodiments according to FIGS. 1 and 3 it will be expedient to displace the steering valve 12, which can be a proportional valve, to its neutral or blocking position, when the steering handwheel is activated. In this case, it is avoided that, under unfavourable circumstances, hydraulic fluid, which was to drive the steering motor 2, can flow off to the tank via the steering valve 12.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic steering with a steering initiator, a steering unit with feedback properties, which can be activated by the steering initiator, an auxiliary-force operated steering valve comprised of a supply connection arrangement having a pressure connection, a tank connection, and a working connection arrangement with two working connections, the steering unit connected to said supply connection arrangement having a pressure connection, a tank connection, and connected to said working connection arrangement with two working connections, said auxiliary-force operated steering valve and said steering unit parallel connected between said supply connection arrangement and said working connection arrangement, and a feedback suppressing device, which is active, when the steering valve is active, wherein the steering initiator interacts with an activation sensor, which deactivates the feedback suppressing device on an activation of the steering initiator.

2. The steering in accordance with claim 1, wherein the steering initiator exists in the form of a steering handwheel, which is connected with the steering unit via a steering shaft, the activation sensor determining an activation of the steering handwheel.

3. The steering in accordance with claim 2, wherein the activation sensor interacts with the steering shaft.

4. The steering in accordance with claim 2, wherein the activation sensor is a torque sensor.

5. The steering in accordance with claim 2, wherein the activation sensor is a rotation angle sensor.

6. The steering in accordance with claim 1, wherein the feedback suppressing device has a change-over valve acting upon the working connection arrangement.

7. The steering in accordance with claim 6, wherein in an activated position the change-over valve blocks at least one working connection (L, R).

8. A hydraulic steering with a steering initiator, a steering unit with feedback properties, which can be activated by the steering initiator,
- an auxiliary-force operated steering valve comprised of a supply connection arrangement having a pressure connection, a tank connection, and a working connection arrangement with two working connections,
- the steering unit connected to said supply connection arrangement comprised of a pressure connection, a tank connection, and two working connections connected to said working connection arrangement,
- said auxiliary-force operated steering valve and said steering unit parallel connected between said supply connection arrangement and said working connection arrangement, and
- a feedback suppressing device, which is active, when the steering valve is active, wherein the steering initiator interacts with an activation sensor, which deactivates the feedback suppressing device on an activation of the steering initiator,
- wherein the working connections of said auxiliary-force operated steering valve and said parallel connected steering unit are connected directly to a steering motor.

* * * * *